US009998422B2

(12) United States Patent
McIsaac et al.

(10) Patent No.: US 9,998,422 B2
(45) Date of Patent: Jun. 12, 2018

(54) EFFICIENT ATTACHMENT OF USER-SELECTED FILES TO E-MAIL FROM HANDHELD DEVICE

(75) Inventors: Steven Douglas McIsaac, Waterloo (CA); Nataliya Martsyna, Waterloo (CA); Graham Russell, Waterloo (CA); Ian Sangster, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 1781 days.

(21) Appl. No.: 12/463,644

(22) Filed: May 11, 2009

(65) Prior Publication Data

US 2009/0282463 A1 Nov. 12, 2009

Related U.S. Application Data

(60) Provisional application No. 61/052,635, filed on May 12, 2008.

(51) Int. Cl.
*G06F 15/16* (2006.01)
*H04L 12/58* (2006.01)
*G06F 21/00* (2013.01)

(52) U.S. Cl.
CPC .................................. *H04L 51/38* (2013.01)

(58) Field of Classification Search
CPC . G06Q 10/107; H04L 67/2804; H04L 51/063; H04L 12/5835; H04L 51/38
(Continued)

(56) References Cited

U.S. PATENT DOCUMENTS 6,374,246 B1 * 4/2002 Matsuo .......................... 709/207
6,424,996 B1 * 7/2002 Killcommons et al. ...... 709/206
(Continued)

FOREIGN PATENT DOCUMENTS

EP 1339195 A1 1/2002
EP 1253761 A2 10/2002

OTHER PUBLICATIONS

Yen-Cheng Lai, et al.: "Design and Implementation of a Wireless Internet Remote Access Platform", Wireless Communications and Mobile Computing, [Online], Jan. 9, 2006 (Jan. 9, 2006), pp. 413-429, XP002534106; URL:http//www3.interscience.wiley.com/journal/112224767/abstract?CRETRY=1&SRETRY=0>.

*Primary Examiner* — Noura Zoubair
(74) *Attorney, Agent, or Firm* — Jose Gutman; Fleit Gibbons Gutman Bongini & Bianco P.L.

(57) ABSTRACT

A wireless telecommunications system includes facilities in a wireless hand-held device (WHHD) that allows a user to browse files available to that user on storage devices in an enterprise network, and to identify one or more such files to be attached to an e-mail message to be composed on or transmitted from the handheld. The system includes facilities in an enterprise network, such as a file delivery server, that cooperates with the WHHD to provide the file browsing service. A mail agent cooperates with the WHHD, responsive to instruction from the handheld to send an e-mail message that is to contain an attachment, to request the file delivery server to retrieve the identified files and assemble an e-mail containing those files as attachments. The WHHD may receive from the user appropriate credentials needed to access files available to that user on storage devices in the enterprise network, and may forward the credential to the file delivery server and the mail agent. These components may use the credentials to provide the file browsing service and to retrieve the identified files.

10 Claims, 4 Drawing Sheets

(58) Field of Classification Search
USPC .................................................. 709/206, 219
See application file for complete search history.

(56) References Cited

U.S. PATENT DOCUMENTS

| | | | |
|---|---|---|---|
| 6,564,248 B1* | 5/2003 | Budge et al. ................. | 709/206 |
| 7,209,953 B2 | 4/2007 | Brooks | |
| 7,257,639 B1* | 8/2007 | Li et al. ........................ | 709/232 |
| 7,412,447 B2 | 8/2008 | Hilbert | |
| 7,519,720 B2 | 4/2009 | Fishman | |
| 2001/0005864 A1* | 6/2001 | Mousseau et al. ........... | 709/318 |
| 2002/0010748 A1 | 1/2002 | Kobayashi et al. | |
| 2002/0138586 A1* | 9/2002 | Paleiov ................ | H04L 51/063 |
| | | | 709/207 |
| 2002/0194307 A1 | 12/2002 | Anderson et al. | |
| 2003/0033371 A1* | 2/2003 | Ueno .......................... | 709/206 |
| 2003/0046587 A1 | 3/2003 | Bheemarasetti | |
| 2003/0157947 A1* | 8/2003 | Fiatal ................ | H04L 12/5895 |
| | | | 455/466 |
| 2003/0160811 A1* | 8/2003 | Zigler ........................... | 345/719 |
| 2003/0225837 A1* | 12/2003 | Delia et al. .................. | 709/206 |
| 2004/0090457 A1* | 5/2004 | Serdy, Jr. .............. | H04L 51/063 |
| | | | 715/752 |
| 2004/0143650 A1* | 7/2004 | Wollowitz .................... | 709/219 |
| 2004/0158607 A1 | 8/2004 | Coppinger | |
| 2004/0162076 A1* | 8/2004 | Chowdry ............ | H04L 63/0281 |
| | | | 455/445 |
| 2004/0186894 A1 | 9/2004 | Jhingan | |
| 2004/0221014 A1* | 11/2004 | Tomkow ................ | H04L 51/30 |
| | | | 709/206 |
| 2005/0091324 A1 | 4/2005 | Flocken | |
| 2006/0031309 A1* | 2/2006 | Luoffo ................ | G06Q 10/107 |
| | | | 709/206 |
| 2006/0155811 A1* | 7/2006 | Goh .................... | G06Q 10/107 |
| | | | 709/206 |
| 2006/0265458 A1 | 11/2006 | Aldrich et al. | |
| 2007/0150521 A1* | 6/2007 | Vedula .......................... | 707/200 |
| 2007/0180032 A1* | 8/2007 | Pearson ........................ | 709/206 |
| 2007/0255792 A1* | 11/2007 | Gronberg ............ | H04L 12/5835 |
| | | | 709/206 |
| 2008/0028044 A1 | 1/2008 | Powers | |
| 2008/0077676 A1* | 3/2008 | Nagarajan et al. ........... | 709/206 |
| 2008/0172483 A1* | 7/2008 | Mickeleit ................ | H04L 51/38 |
| | | | 709/223 |

* cited by examiner

EFFICIENT ATTACHMENT OF USER-SELECTED FILES TO E-MAIL FROM HANDHELD DEVICE

This application claims the benefit of U.S. Provisional Application No. 61/052,635, filed May 12, 2008.

BACKGROUND

Several known e-mail systems provide facilities to incorporate one or more attachment files into an e-mail message to be transmitted from a sender to a recipient. Attachments may be formatted, for example, as specified in RFC-1341 MIME (Multipurpose Internet Mail Extensions): Mechanisms for Specifying and Describing the Format of Internet Message Bodies.

In known e-mail systems, attachments are typically incorporated into an e-mail message by the mail user agent (MUA)—the program which provides a mail sending and receiving user interface to the mail user—either at the time the attachment is identified by the user to the MUA, or at some other time before the message is released for transmission.

In a typical computing environment in which the user employs a personal computer workstation, the MUA is a conventional e-mail program, such as Mozilla Thunderbird, Microsoft Outlook, or the like, which may have direct access to files on one or more of local storage devices and network storage. Incorporating an attachment into an e-mail message involves adding one or more e-mail headers signaling that attachments are present and identifying a boundary token (if the attachment is the first attachment), retrieving the attachment from storage, encoding the attachment in a format appropriate for the data contained in the attachment, appending an attachment preamble to the message, appending the encoded attachment to the message, and appending an attachment postamble to the message. Once assembled, the complete e-mail, including all attachments, is transmitted as a unit by the MUA. The MUA runs as a non-privileged program under the user's credentials on the user's computer and therefore has direct access to the same files on local and network storage that the user and other ordinary programs running on his behalf would have.

In recent years, wireless hand-held devices (WHHD) that provide a number of services, including e-mail, have become popular and useful. Although a number of network topologies are possible, one advantageous arrangement employs a hand-held device operatively coupled via one or more wireless network links to enterprise networks or application service providers, which offer a variety of application services, including e-mail. The wireless network links may employ any of a number of technologies, including without limitation the family of technologies referred to as WiFi, carrier-operated wireless data networks, such as those operating as part of or overlaid on cellular telecommunications networks of any generation, and the like. In addition to the wireless component, the network path between the WHHD and the enterprise network or application service provider may involve additional network media, including the internet and private network facilities, and may involve multiple carriers and other service providers.

A disadvantage of conventional MUAs when used with a WHHD is that transmission of large e-mails containing attachments requires transfer of large amounts of data via the wireless network. Each attachment file must traverse the wireless network at least twice: a first time when retrieved by the MUA for attachment to the e-mail message, and a second time as part of the transmitted e-mail message. The network path between the WHHD and the enterprise network of application service provider may be capacity-limited, slow, expensive, or high in latency. Thus, transmitting large e-mails containing attachments could involve expenses and delays which are unacceptable to users, carriers, and service providers.

In a known e-mail arrangement for WHHDs, an e-mail message containing an attachment and received on behalf of the user may be forwarded at the request of the user to another recipient without transmitting the entire attachment to the WHHD, and without the WHHD itself retransmitting the attachment as part of the forwarded e-mail message. A modified version of the attachment suitable for display to the user on the HHD may be transmitted to the HHD, but the entire attachment is retained in storage of an enterprise e-mail application server. However, this arrangement only provides capabilities for forwarding e-mails that already contain attachments, which are retained in the enterprise e-mail application server. It does not provide the capability to add arbitrary attachments—i.e., attachments which may be freely selected by the user from any files accessible thereto, which have not arrived as an attachment to a prior e-mail message, and which are not retained in the enterprise e-mail application server—or to send attachments with new, non-forwarded e-mail.

Thus, there is a need for an e-mail system for use with wireless handheld devices that allows the attachment to e-mail messages of files arbitrarily selected by the user while minimizing transport of attachment content over the wireless network.

BRIEF DESCRIPTION OF THE DRAWINGS

The disclosure will be mote clearly understood by reference to the following detailed description of example embodiments in which the invention may be practiced, and in conjunction with the accompanying drawings by way of illustration, in which.

DETAILED DESCRIPTION

Figure 1:
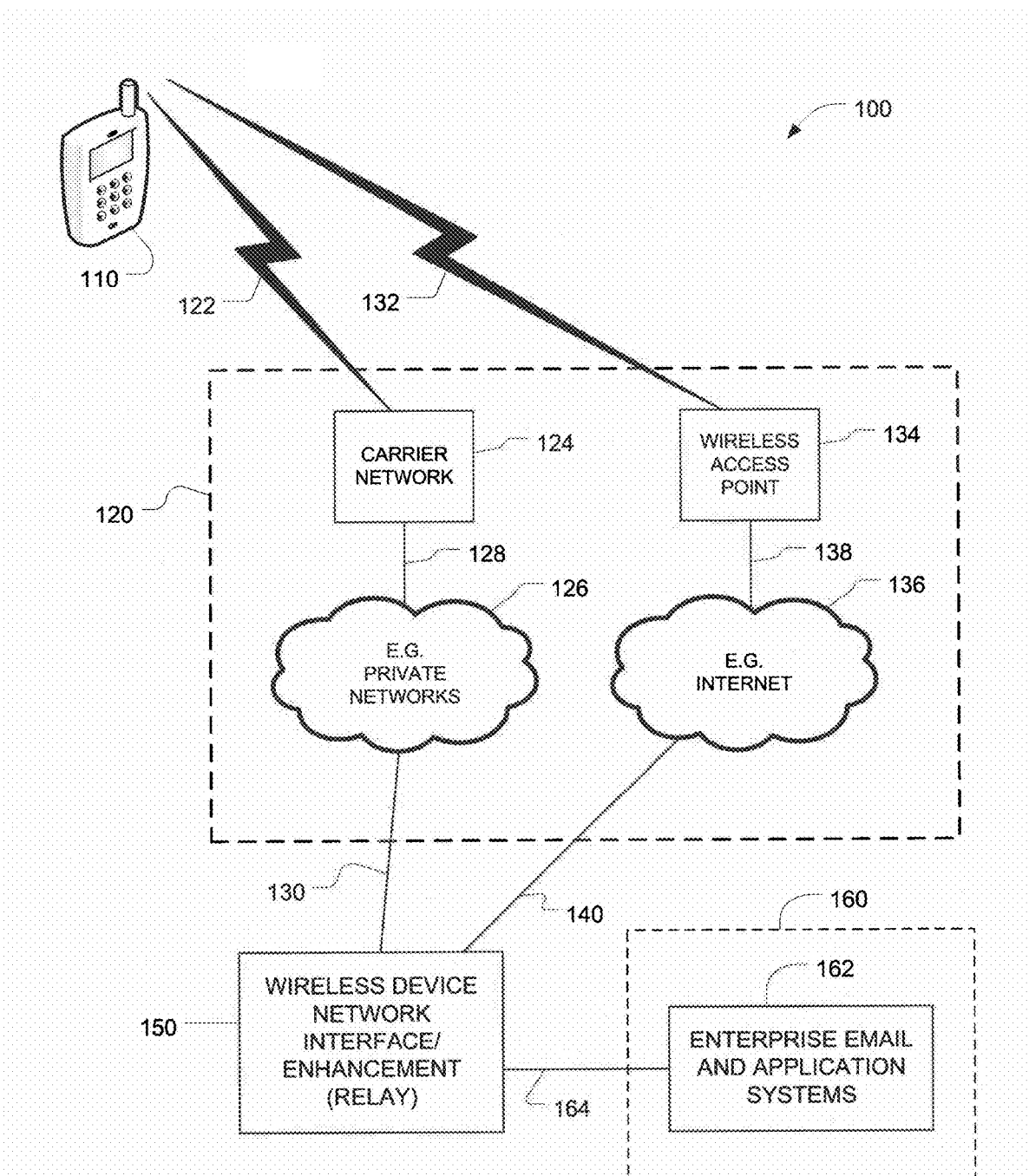
FIG. 1 is a high-level block diagram of a system constructed for providing attachments to e-mail messages transmitted from or composed on a wireless hand-held device (WHHD) in accordance with one embodiment described in this application.

A system 100 constructed according to aspects of the present invention for providing attachments to e-mail messages transmitted from or composed on a wireless hand-held device (WHHD) is shown generally in high-level schematic form in FIG. 1. FIG. 1 shows an example environment in which embodiments of the invention may be used. It will be appreciated that aspects of the invention may be applied to other environments with or without modifications, which modifications would be within the ken of one of skill in the art.

According to an aspect of the present invention, system 100 includes facilities in a WHHD that allows a user to browse files available to that user on storage devices in an enterprise network, and to identify one or more such files to be attached to an e-mail message to be composed on or transmitted from the handheld. According to a further aspect of the present invention, system 100 includes facilities in an enterprise network, such as a file delivery server, that cooperates with the WHHD to provide the file browsing service. A mail agent also cooperates with the WHHD, responsive to instruction from the WHHD to send an e-mail message that is to contain an attachment, to request that the file delivery server retrieve the identified files, and to assemble an e-mail containing those files as attachments. According to a further aspect of the invention, the WHHD may receive from the user appropriate credentials needed to access files available to that user on storage devices in the enterprise network, and may forward the credentials to the file delivery server and the mail agent. These components may use the credentials to provide the file browsing service and to retrieve the identified files.

The present application relates to telecommunications systems, including multimedia telecommunications systems, which may be implemented using a variety of electronic and optical technologies, including but not limited to: analog electronic systems; digital electronic systems; microprocessors and other processing elements; and software and otherwise embodied collections of steps, instructions, and the like, for implementing methods, processes, or policies in conjunction with such systems and processing elements. It will be appreciated that in the telecommunications arts, various signal leads, busses, data paths, data structures, channels, buffers, message-passing interfaces, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures. The terms "interconnected" and "operatively coupled" are intended to refer interchangeably to a connection between components that allows data to pass therebetween, perhaps through one or more intermediate components.

As best seen in FIG. 1, a wireless telecommunications system 100 providing e-mail service to wireless hand-held devices and constructed according to aspects of the present invention for providing attachments to e-mail messages transmitted from or composed on a wireless hand-held device may comprise wireless hand-held device (WHHD) 110, an enterprise network 160, and one or more networks 120 coupling the WHHD to enterprise network 160. Although only a single WHHD 110 is shown for simplicity, commercial embodiments contemplate the use of a very large number of WHHDs 110.

Optionally, a wireless device network interface/enhancement facility (relay) 150 may be interposed between networks 120 and enterprise network 160. Relay 150 may provide a number of functions that facilitate and enhance the interface of the enterprise network 160 and WHHD 110, including without limitation, tracking the availability of WHHD 110 for communications, tracking which of several possible networks with which WHHD 110 may be in communication, managing flow of communications between WHHD 110 and enterprise network 160, and ensuring reliable communications between WHHD 110 and enterprise network 160. Relay 150 may be implemented and may function as described in Lewis U.S. Pat. No. 7,010,303, which is incorporated by reference herein. Although an embodiment constructed according to aspects of the present invention might operate successfully without relay 150, and it is therefore optional, further description of wireless system 100 will treat relay 150 as present; one of skill in the art will appreciate that connections to relay 150 could also be made directly to enterprise network 160, and some functions of relay 150 might be performed by elements of enterprise network 160.

WHHD-to-enterprise networks 120 may comprise one or more wireless networks and any additional transport networks needed to couple such wireless networks to relay 150. By way of example but not limitation, networks 120 may include a first network 124 which may be a telecommunications-carrier-operated public network, such as a GPRS, UMTS, CDMA, or other similar network of any generation or technology, offering data services to public subscribers or users. Networks 120 may also include, for example, a wireless network access point 134 for providing access via, for example, the group of wireless technologies known as WiFi. Other wireless access technologies could also be used. WHHD 110 preferably includes equipment compatible with at least one of the networks 124, 134 such that one or more wireless data communications links, such as 122, 132 may be established between the WHHD 110 and corresponding ones of networks 124, 134.

As is known in the art, networks 124 and 134 may be connected to relay 150 via one or more transport networks 126, 136. Transport networks 126, 136 may be realized using any suitable network technology, including without limitation leased data lines, virtual private networks, the Internet, and the like. For example, carrier networks 124 may typically (but not necessarily) be connected to relay 150 via leased lines or other private, dedicated, or non-shared facilities. For another example, WiFi access point 134 may typically (but not necessarily) be connected to relay 150 via the public Internet. The transport networks 126, 136 may be connected to relay 150 via any suitable links 130, 140. Relay 150 may be connected to enterprise network 160 via any suitable link 164.

Enterprise network 160 may, for example, be the internal network of a business or other enterprise, and may provide a variety of network and information services to internal users. Enterprise network 160 typically includes systems 162 for furnishing to users enterprise e-mail, personal computing, information storage, and other applications. Enterprise network 160 could also be the network of an Internet Service Provider (ISP) or an Application Service Provider (ASP), which may similarly provide network and information services to external subscribers. Where the term "enterprise" is used herein, unless otherwise specified, it is intended to refer to the e-mail and other applications and services, and the networks, servers, software, facilities and other infrastructure arranged to provide such applications and services, similar to those typically provided to corporate users, whether such applications and services are provided by an organization for internal use, or by a service provider for external use.

Figure 2:
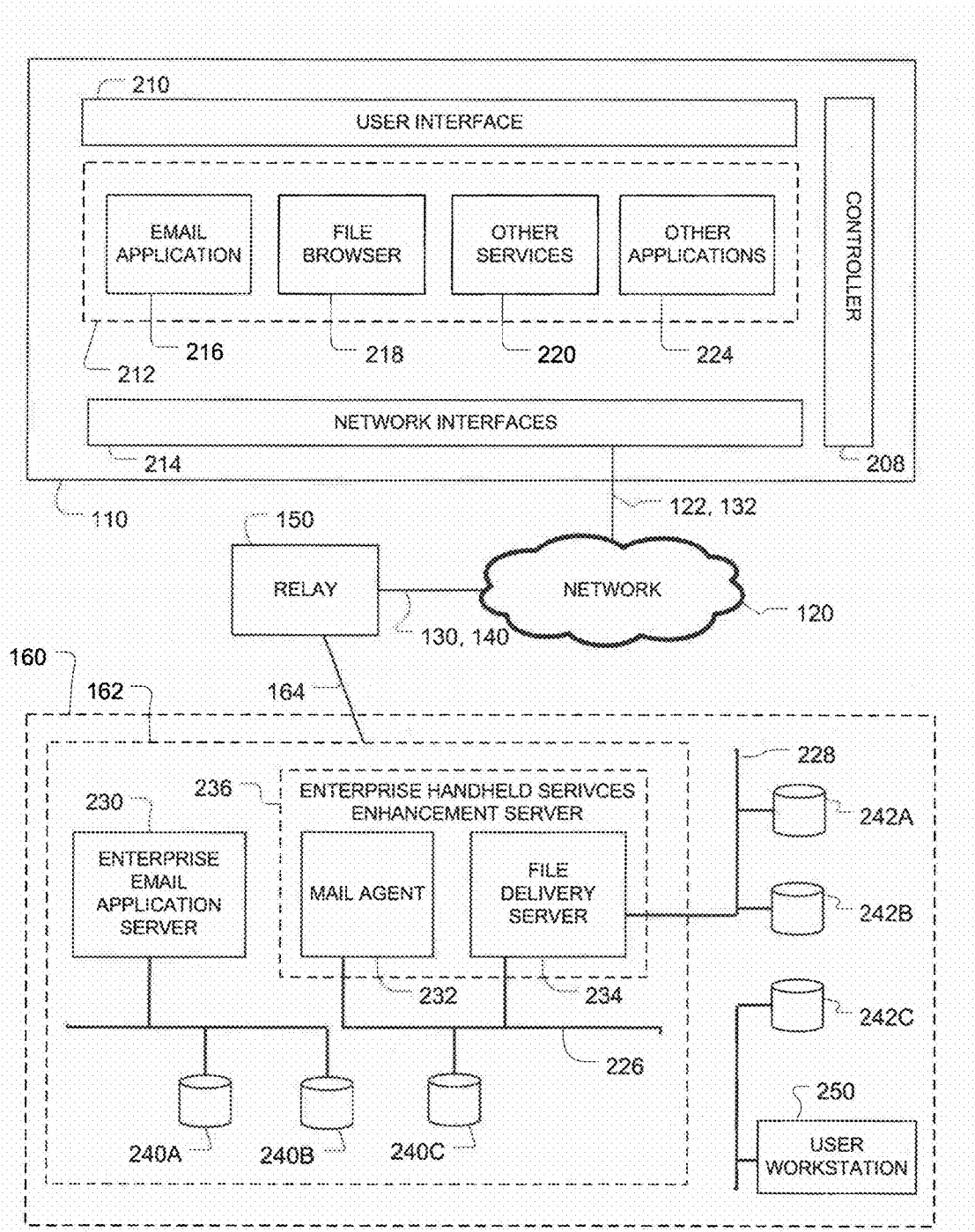
FIG. 2 is a more detailed block diagram of elements of the system of FIG. 1.

FIG. 2 depicts a more detailed block diagram of elements of the system 100 of FIG. 1, constructed according to aspects of the present invention. The general design of wireless hand-held devices is known. Accordingly, discussion of WHHD 110 will generally be limited to those elements particularly relevant to an understanding of the invention and its embodiments. As best seen in FIG. 2, WHHD 110 may comprise a controller 208, a user interface system 210, and applications and services suite 212, and a network interface system 214. As is known in the art, controller 208 may be realized as a microprocessor based controller containing a CPU, read-write memory (e.g., RAM), a generally read-only memory (which may be electronically programmable from time to time, as in EEPROM, FLASH, and similar technologies), optional ancillary components, and may comprise or be coupled to various input/output devices, including components of user interface 210 and network interface 214. Controller 208 also includes appropriate software or firmware, which may include operating system software, for implementing its control functions, and for operating cooperatively with user interface 210 and network interface 214.

User interface 210 includes appropriate hardware and software for implementing a suitable user interface to enable a user to operate the applications and services provided by the device (in conjunction, where applicable) with external networks and information services. For example, user interface 210 may include a display and keyboard (see FIG. 1), and other input and output devices such as a trackball or other pointing device, a speaker, and the like. Other user interface hardware may also be provided. User interface 210 may also incorporate software or firmware for driving the user interface hardware, and for providing services to applications and services on the device. The software or firmware may be implemented as libraries, routines, procedures, objects, message-based interfaces, or other software constructs for performing user interface tasks, as is known in the art. The software or firmware may execute on controller 208.

WHHD applications and services suite 212 may provide a variety of applications and services to the user, in cooperation with user interface 210. In particular, applications/services 212 include at least an e-mail application 216 and a file browser 218, and may also include services 220 and applications 224. E-mail application 216 and file browser 218 cooperate with components of the enterprise network 160 to provide file browsing and e-mail services, and further to provide the e-mail attachment service according to an aspect of the present invention. Applications/services 212 may take the form of software or firmware and may execute on controller 208.

Network interface system 214 provides an interface between applications/services 212 and one or more wireless networks 120, such as carrier network 124 and WiFi access point 134 (FIG. 1). Network interface 214 incorporates hardware and firmware or software for implementing at least the physical link layers and data link layers required for accessing wireless networks 120. Network interface 214 may further optionally implement additional layers required for accessing wireless networks 120, including but not limited to the network layer and the transport layer. Alternatively, such layers may be implemented in elements of applications/services 212. The software or firmware may be implemented as libraries, routines, procedures, objects, message-based interfaces, or other software constructs for performing user interface tasks, as is known in the art. The software or firmware may execute on controller 208.

As best seen in FIG. 2, enterprise network 160 may include, by way of example but not limitation, a collection of enterprise e-mail and applications systems 162, some of which may be arranged to provide service to WHHDs such as WHHD 110. Enterprise systems 162 may include an enterprise e-mail application server 230 and an enterprise hand-held services enhancement server 236, which may include as components a mail agent 232 and a file delivery server 234. These elements may be interconnected using any suitable interconnect facility, such as network 226. Enterprise systems 162 may further comprise one or more storage facilities, such as disk drives or storage systems, such as system file storage units 240A, 240B, 240C, also interconnected via network 226.

Also part of enterprise network 160, but conceptually distinct from enterprise systems 162, may be one or more user workstations, such as workstation 250, and one or more user-accessible storage facilities, such as disk drives or storage systems, such as user-accessible file storage 242A, 242B, 242C. Although only a single user workstation 250 is shown for simplicity, commercial embodiments may employ a large plurality of such workstations. Workstation 250 may be interconnected using any suitable interconnect facility, such as network 228. Although system file storage 240A, 240B, 240C and user-accessible file storage 242A, 242B, 242C are shown as distinct elements, these facilities may actually be realized using the same equipment or distinct equipment. They are depicted as distinct to emphasize the concept that some data known to and accessible by elements of enterprise systems 162 may not be directly accessed in file form by the user. Likewise, some data known to and accessible by the user in file form may not generally be directly accessed by elements of enterprise systems 162. Similarly, although networks 226 and 228 are shown as distinct networks, they may actually be part of a single network.

File delivery server 234 is shown as interconnected to user file storage 242A, 242B, 242C via user storage network 228 to indicate that the file delivery server 234 may access user file storage under certain conditions.

Mail server 230 may be implemented as any suitable e-mail server capable of transmitting e-mail. For example, mail server 230 may be implemented as a Microsoft Exchange, a Lotus Notes server, or another SMTP mail transport agent such as Sendmail. In many embodiments, mail server 230 will also be capable of receiving e-mail messages. Enterprise hand-held services enhancement server 236 optionally provides an interface between the WHHD 110 and the mail server 230. Among several functions of enterprise HH server 236, when an e-mail message arrives for the user at mail server 230, enterprise HH server 236 pushes that e-mail message out to WHHD 110.

When WHHD 110 transmits an e-mail message, the mail agent 232 of enterprise HH server 236 receives instructions and certain portions of the contents of the e-mail message from the WHHD 110. The mail agent 232 responsively constructs the contents of the e-mail message from the portions received from WHHD 110, portions the enterprise HH server 236 may have retained from prior messages (if the message is a forward or a reply), and any attachments identified by the instructions and received from file delivery server 234 (as described further in greater detail). Mail agent 232 further responsively calls appropriate API components of the mail server 230 to cause it to assemble and transmit the e-mail message.

Although referred to here as "file delivery server" 234, this component may provide a number of services to mail agent 232 and to WHHD 110. File delivery server 234 assists in furnishing information used by file browser 218 to provide a file browsing service on WHHD 110. In addition, when a file is to be attached to an e-mail message, mail agent 232 requests the file from file delivery server 234, furnishing an identification of the file and the credentials needed to access it. The file delivery server 234 responsively retrieves the file and supplies it to mail agent 232. The mail agent 230 then encodes the file in an appropriate format, assembles the attachment into the e-mail, and causes the e-mail to be transmitted by mail server 230. File delivery server 234 may provide additional services, such as transcoding, segmenting, or rendering for display attachments which have been received in an e-mail and are to be displayed on the WHHD 110.

Mail server 230, enterprise hand-held services enhancement server 236, mail agent 232, and file delivery server 234 may be realized using one or more suitable programmable computer systems running a commercially available operating system. For example, these items may be realized using commercial server computers having Intel IA-32-based processors and running an operating system in the Microsoft Windows Server family. Other computers and operating systems could also be used. Although some of elements 230, 232, 234, and 236 are depicted as distinct elements and may be realized as such (i.e., using separate server computers), skilled artisans will appreciate that these elements may be refactored or virtualized as necessary to meet expected load. Thus, these elements could also be realized as different processes running on the same computer or on several computers.

Figure 3:
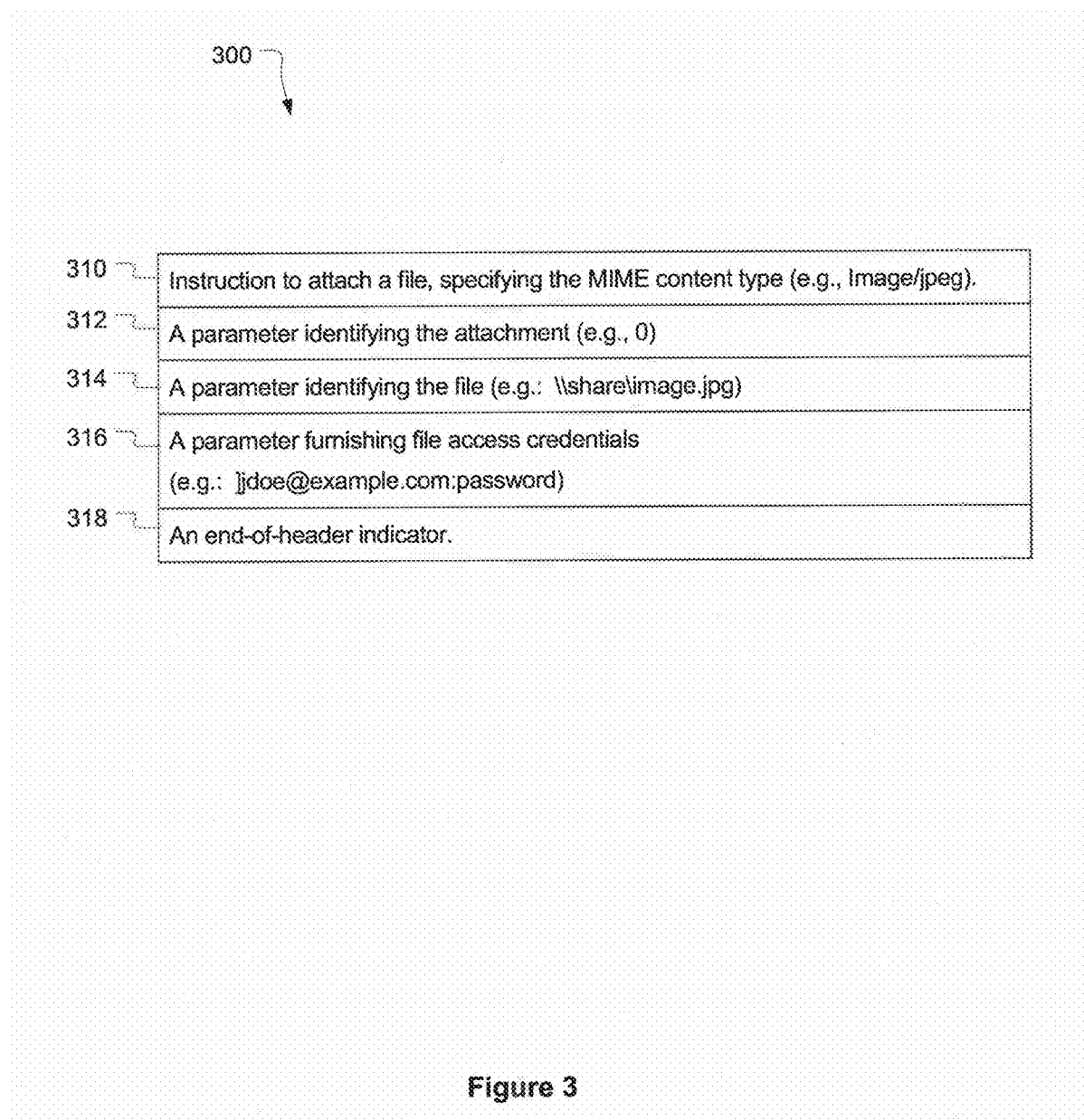
FIG. 3 is a data structure diagram depicting the format of information needed to identify to a mail agent or file delivery server a file to be attached to an e-mail message and to authorize access to the file, for use with the system of FIGS. 1-2.

FIG. 3 is a data structure diagram depicting the format of a data structure 300 containing information needed to identify to the mail agent 232 a file to be attached to an e-mail message and to authorize access to the file, for use with the system 100. As best seen in FIG. 3, the information may be delivered as an instruction to the mail agent 232 comprising several fields.

Field 310 comprises an instruction to attach a file, specifying the MIME content type (e.g., Image/jpeg). Field 312 comprises a parameter identifying the attachment (e.g., 0). This parameter may be a sequence number of the attachment within the e-mail message. Field 314 comprises a parameter identifying the file to be attached (e.g.: \\share\image.jpg). The identifying parameter may take the form of a path and file name compliant with the requirements of the operating system used by the file delivery server 234, such as Microsoft Windows. In other embodiments, the identifying parameter may take the form of a Uniform Resource Identifier (URI). Field 316 comprises a parameter furnishing file access credentials (e.g.: jdoe@example.com:password). The file access credentials may be in a form compliant with the requirements of the operating system of file delivery server 234. Field 318 comprises an end-of-header indicator.

Figure 4:
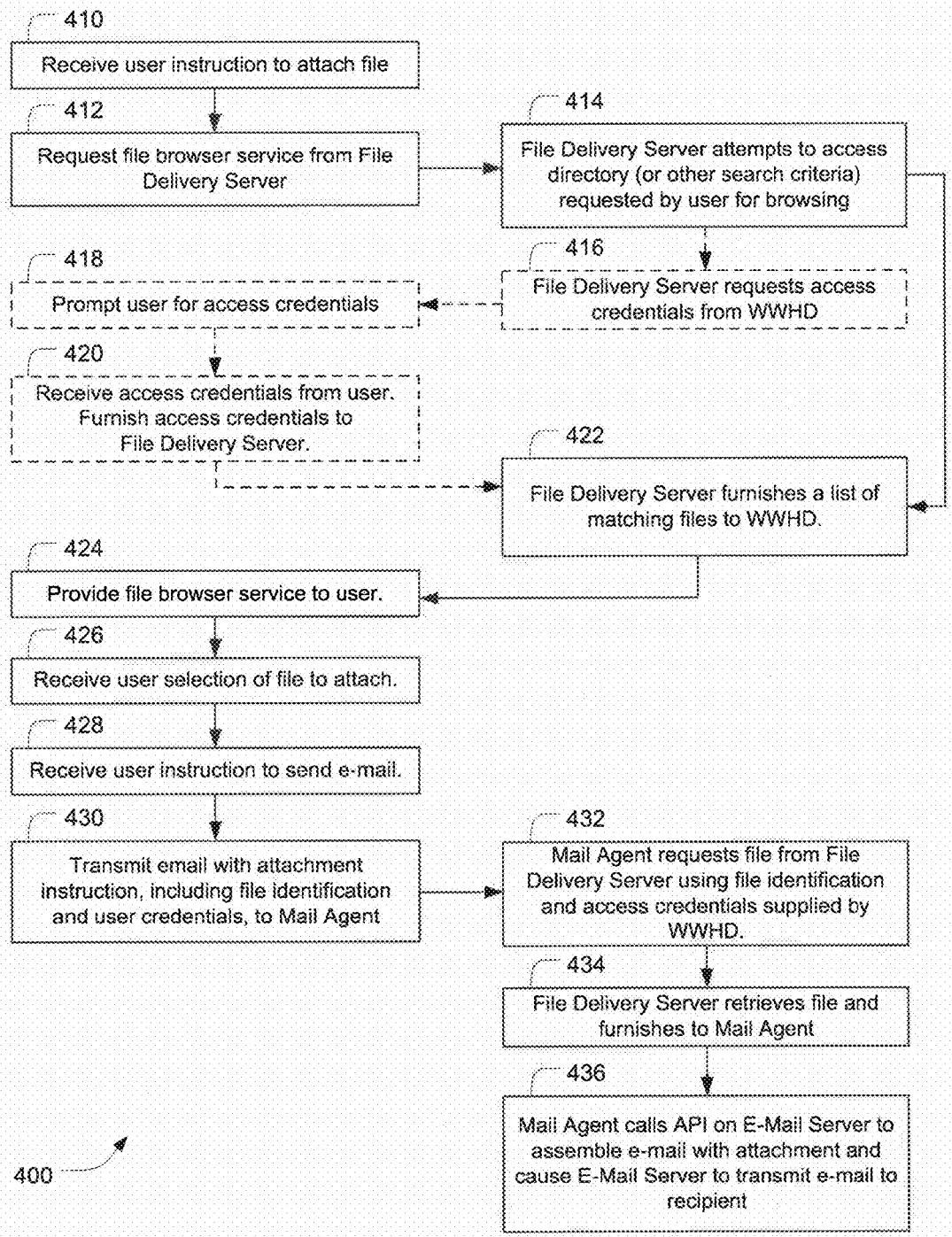
FIG. 4 is a flow diagram showing an example method for use in conjunction with the system of FIGS. 1-3 for attaching a file to an e-mail message transmitted from or composed on a wireless hand-held device.

In accord with a further aspect of the present invention, FIG. 4 is a flow diagram of a method 400 for use with the system of FIGS. 1-3 for efficiently attaching to an e-mail message transmitted from a hand-held device an attachment not already stored on the device. One of skill in the art will appreciate that the method may be used with the apparatus of FIGS. 1-3, but could also be used with other apparatus without departing from the spirit of the invention. Accordingly, some primary steps are presented in a generalized form that does not rely on the particular apparatus of FIGS. 1-3. It is noted in the description of certain steps and substeps that such steps may be performed by specific elements of the apparatus of FIGS. 1-3. The association of steps and apparatus is done by way of example but not limitation, and it is to be understood that these steps could be performed by other apparatus. Moreover, the term "step" is used herein to refer to both the general steps associated with method 400 and to more detailed substeps which may be comprised as part of a more general step. Some steps are optional. Optional substeps may be omitted or replaced by other specific method steps that implement or embody the function of the primary step. Although discrete steps are mentioned, it will be understood by one of skill in the art that in some embodiments, the functions defined in the steps may be performed as continuous processes.

In step 410, the WHHD 110 receives a user instruction to attach a file.

In step 412, the WHHD 110 requests the file browser service from file delivery server 234. The request includes an identification of the directory the user chooses to browse. In some embodiments, file selection criteria other than a directory could be specified by the user, and would be provided in the request. The request may omit credentials needed to access the directory or file.

In step 414, the file delivery server 234 attempts to access the directory (or other search criteria) requested by the user for browsing. In one embodiment, the file delivery server 234 uses appropriate elements of an API of the Microsoft Windows operating system to access the directory. In other embodiments, file delivery server 234 could use other APIs, or could attempt directly to access directories or files using any appropriate network transactions supported by the user file storage facilities 242A, 242B, 242C. For example, file delivery server 234 could use elements of SMB/CIFS protocol, the NFS protocol, or the like.

Steps 416 through 420 are optional in that they are executed only if credentials are required for access to the directory to be browsed. If credentials are required, then in step 416, the file delivery server 234 requests access credentials from WHHD 110. In step 418, the WHHD 110 prompts the user for access credentials. In step 420, the WHHD 110 receives access credentials from user, and furnishes them to the file delivery server 234.

In step 422 the file delivery server 234 furnishes a list of files in the user-selected directory (or, in some embodiments, matching other user-specified criteria) to WHHD 110. If credentials were required in order to access the directory or files, file delivery server 234 will have received them from WHHD 110 as a result of step 420.

In step 424, the file browser 218 of WHHD 110 provides a file browser service to user. A list of files from which selection may be made is presented to the user. In step 426, the WHHD 110 receives the user's selection of a file to attach. Thereafter, the user may continue to compose the e-mail message to which the file will eventually be attached.

In step 428, the WHHD 110 receives an instruction from the user send the e-mail message. In step 430, the WHHD 110 transmits portions of the e-mail to mail agent 232, along with instructions to attach any desired attachment files, and an instruction to send the e-mail message. The attachment instruction is constructed pursuant to FIG. 3, and includes an identification of the files to be attached and the credentials required to access them.

In step 432, the mail agent 232, responsive to the aforementioned instructions requests the files to be attached from the file delivery server 234 using the file identification and access credentials supplied by WHHD 110. In step 434, the file delivery server 234 responsively retrieves the files and furnishes them to mail agent 232.

In step 436, the mail agent 232 calls appropriate elements of an API of mail server 230 to cause it to assemble a complete e-mail message comprising the portions received from WHHD 110, portions the enterprise HH server 236 may have retained from prior messages (if the message is a forward or a reply), and any attachments identified by the instructions and received from file delivery server 234. The mail agent 232 further calls appropriate elements of the mail server API to cause the mail server 230 to transmit the e-mail message to the recipient.

The steps or operations described herein are just for example. There may be many variations to these steps or operations without departing from the spirit of the invention. For instance, the steps may be performed in a differing order, or steps may be added, deleted, or modified.

The embodiments described herein are examples in accordance with various aspects of this disclosure. Thus it will be appreciated that although the embodiments are described in terms of specific technologies, other equivalent technologies could be used to implement systems in keeping with the scope of the present invention.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method in a wireless hand-held device of composing an e-mail message that will include a remote file attachment, comprising:

receiving, at the wireless hand-held device, a user instruction to attach a file to an e-mail message sent by an enterprise email server to at least one recipient, the enterprise email server coupled to the wireless hand-held device by an enterprise hand-held services enhancement server that includes a file-delivery-server and a mail agent;

receiving, at the wireless hand-held device, from the file-delivery-server, a furnished list of one or more user-directory files that are located, within the enterprise, in at least one user-accessible directory location, the one or more user-directory files being stored in user file storage and being directly accessible in file form by the wireless hand-held device browsing the user file storage, while the one or more user-directory files in the at least one user-accessible directory location not being directly accessible by the enterprise email server;

receiving, at the wireless hand-held device, user selection of a user-directory file, selected from the file-delivery-server furnished list of one or more user-directory files, to attach to the e-mail message;

receiving, at the wireless hand-held device, user instruction to send the e-mail message; and sending, from the wireless hand-held device over a wireless communication network, to the mail agent within the enterprise hand-held services enhancement server, an e-mail instruction message containing a portion of the e-mail message and an attachment instruction identifying a user-accessible directory location of the selected user-directory file, wherein the attachment instruction causing the mail agent to retrieve, with the file-delivery-server, the selected user-directory file from the identified user-accessible directory location, to assemble a complete e-mail message comprising at least the portion of the e-mail message received from the wireless hand-held device, a portion of a message that the enterprise hand-held services enhancement server retained from a prior e-mail message being forwarded or replied to in the e-mail message, and the selected user-directory file identified in the attachment instruction, and send the complete e-mail message to the at least one recipient via the enterprise email server;

wherein the enterprise email server is separate from the enterprise hand-held services enhancement server; and wherein the attachment instruction further comprises a parameter furnishing file access credentials required for accessing the selected user-directory file and for the file-delivery-server to retrieve the selected user-directory file from the identified user-accessible directory location, the file access credentials comprising at least an email address and a password for the email address, and a packet header of the e-mail instruction message including the attachment instruction with the file access credentials.

2. The method of claim 1, further comprising:

after receiving an instruction from a user interface at the wireless hand-held device to attach a file to an e-mail message to be sent to at least one recipient, requesting a file browser service from the file-delivery-server, wherein the file-delivery-server resides within the enterprise hand-held services enhancement server and wherein the file-delivery-server provides services among one or more of transcoding, segmenting, and rendering for display attachments which have been attached to the complete e-mail message.

3. The method of claim 1, wherein the attachment instruction further comprises a parameter specifying the MIME content type of the user-directory file.

4. The method of claim 1, further comprising:

receiving, via a user input device at the wireless hand-held device, user-provided credentials; and wherein the parameter in the attachment instruction includes the user-provided credentials required for accessing the selected user-directory file and for the file-delivery-server to retrieve the selected user-directory file from the identified user-accessible directory location.

5. A computer-implemented method performed with a computer system operatively coupled to a wireless network and including a mail agent located within an enterprise hand-held services enhancement server for attaching a user-directory file to an e-mail message, comprising:

furnishing, to a wireless hand-held device, a list of one or more user-directory files that are located, within the enterprise, in at least one user-accessible directory location, the one or more user-directory files being stored in user file storage and being directly accessible in file form by the wireless hand-held device browsing the user file storage, while the one or more user-directory files in the at least one user-accessible directory location not being directly accessible by the mail agent;

receiving, from the wireless hand-held device over a wireless communication network, an e-mail instruction message containing a portion of the e-mail message and an attachment instruction identifying the user-directory file located elsewhere from the wireless hand-held device and in the at least one user-accessible directory location;

retrieving, with a file-delivery-server located within the enterprise hand-held services enhancement server and based on the attachment instruction, the identified user-directory file from the at least one user-accessible directory location;

assembling a complete e-mail message, the complete e-mail message comprising at least the portion of the e-mail message received from the wireless hand-held device, a portion of a message that the enterprise hand-held services enhancement server retained from a prior e-mail message being forwarded or replied to in the e-mail message, and the identified user-directory file retrieved from the at least one user-accessible directory location; and sending the complete e-mail message to an e-mail server and thereby to a recipient, and wherein the e-mail server is separate from the mail agent; and wherein the attachment instruction further comprises a parameter furnishing file access credentials required for accessing the identified user-directory file and for the file-delivery-server to retrieve the identified user-directory file from the at least one user-accessible directory location, the file access credentials comprising at least an email address and a password for the email address, and a packet header of the e-mail instruction message including the attachment instruction with the file access credentials.

6. The method of claim 5 wherein assembling a complete e-mail message comprises:

the mail agent calls elements of an API of the e-mail server causing the e-mail server to assemble the complete e-mail message.

7. A wireless hand-held device comprising:

a user interface;

a file browser that uses user-directory information of one or more user-directory files furnished from a file-delivery-server located within an enterprise hand-held services enhancement server but elsewhere from said device, the one or more user-directory files being located, within the enterprise, in at least one user-accessible directory location stored in user file storage and being directly accessible in file form by the wireless hand-held device browsing the user file storage while the one or more user-directory files in the at least one user-accessible directory location not being directly accessible by a mail agent located within the enterprise hand-held services enhancement server;

a wireless network interface for accessing a wireless network;

an e-mail application; the e-mail application being configured to:

receive from the file-delivery-server a furnished list of one or more user-directory files that are located in the at least one user-accessible directory location in the user file storage;

receive via the user interface a request to attach to an e-mail message to be sent to a recipient a user-directory file selected from the user-directory information;

receive from the file browser a selection of the selected user-directory file, selected from the file-delivery-server furnished list of one or more user-directory files, to be attached to the e-mail message; and transmit via said wireless network interface to the mail agent an e-mail instruction message containing a portion of the e-mail message and an attachment instruction to retrieve the selected user-directory file from an identified user-accessible directory location and send, with an e-mail server separate from the enterprise hand-held services enhancement server, to the recipient a complete e-mail message containing the portion of the e-mail message and the retrieved user-directory file as an attachment; and wherein the attachment instruction further comprises a parameter furnishing file access credentials required for accessing the selected user-directory file and for the file-delivery-server to retrieve the selected user-directory file from the identified user-accessible directory location, the file access credentials comprising at least an email address and a password for the email address, and a packet header of the e-mail instruction message including the attachment instruction with the file access credentials; and where the complete e-mail message, as assembled and sent to the recipient with the e-mail server, includes the portion of the e-mail message received from the wireless hand-held device, a portion of a message that the enterprise hand-held services enhancement server retained from a prior e-mail message being forwarded or replied to in the e-mail message, and the selected user-directory file.

8. An enterprise hand-held services enhancement server comprising:

a computer system operatively coupled to a wireless network;

a mail agent for receiving from a wireless hand-held device, via the wireless network, an e-mail instruction message containing a portion of an e-mail message and an attachment instruction identifying a user-accessible directory location of a user-directory file selected by a user of the wireless hand-held device, and for transmitting with an e-mail server a complete e-mail message containing the selected user-directory file as an attachment to a recipient, said mail agent adapted to:

responsive to the attachment instruction received from the wireless hand-held device, request said selected user-directory file be retrieved from the identified user-accessible directory location by a file-delivery-server that resides within the enterprise hand-held services enhancement server, the received attachment instruction including identification of the user-accessible directory location of the selected user-directory file, the selected user-directory file being stored in user file storage, within the enterprise, and being directly accessible in file form by the wireless hand-held device browsing the user file storage while the user-directory file in the identified user-accessible directory location not being directly accessible by the e-mail server; and wherein the attachment instruction further comprises a parameter furnishing file access credentials required for accessing the selected user-directory file and for the file-delivery-server to retrieve the selected user-directory file from the identified user-accessible directory location, the file access credentials comprising at least an email address and a password for the email address, and a packet header of the e-mail instruction message including the attachment instruction with the file access credentials;

receive the selected user-directory file from said file-delivery-server; and instruct the e-mail server to assemble the complete e-mail message including at least the portion of the e-mail message received from the wireless hand-held device, a portion of a message that the enterprise hand-held services enhancement server retained from a prior e-mail message being forwarded or replied to in the e-mail message, and the selected user-directory file as an attachment and send the complete e-mail message to the recipient; and wherein the e-mail server is separate from the enterprise hand-held services enhancement server.

9. An enterprise mail system operatively coupled to a wireless network for use with a wireless hand-held device comprising:

a computer system operatively coupled to a wireless network and user file storage;

a file-delivery-server operatively coupled to the user file storage containing one or more user-directory files located, within the enterprise, at user-accessible directory locations in the user file storage;

an e-mail server;

a mail agent, the mail agent and file-delivery-server forming a part of an enterprise hand-held services enhancement server operatively coupled to the computer system, said mail agent configured to:

furnish, to the wireless hand-held device coupled to the wireless network, a list of the one or more user-directory files that are located in the user-accessible directory locations, the one or more user-directory files being directly accessible in file form by the wireless hand-held device browsing the user file storage, while the one or more user-directory files in the user-accessible directory locations not being directly accessible by the e-mail server;

receive, from the wireless hand-held device via the wireless network, an e-mail instruction message containing a portion of an e-mail message, an attachment instruction identifying a user-accessible directory location of a user-directory file selected from the furnished list by a user of the wireless hand-held device, and a request to send a complete e-mail message to a recipient; and wherein the attachment instruction further comprises a parameter furnishing file access credentials required for accessing the selected user-directory file and for the file-delivery-server to retrieve the selected user-directory file from the identified user-accessible directory location, the file access credentials comprising at least an email address and a password for the email address, and a packet header of the e-mail instruction message including the attachment instruction with the file access credentials;

responsive to the attachment instruction, receive the selected user-directory file from said file-delivery-server; and instruct the e-mail server to assemble the complete e-mail message where the complete e-mail message includes the portion of the e-mail message received from the wireless hand-held device, a portion of a message that the enterprise hand-held services enhancement server retained from a prior e-mail message being forwarded or replied to in the e-mail message, and the selected user-directory file as an attachment, and to send the complete e-mail message to the recipient; and wherein the e-mail server is separate from the mail agent.

10. The system of claim 9, wherein the enterprise hand-held services enhancement server provides an interface between wireless hand-held device and the e-mail server and wherein the enterprise hand-held server pushes an incoming e-mail message to the wireless hand-held device when the incoming email message arrives at the e-mail server.

* * * * *